Nov. 22, 1966 E. W. SCHARRE 3,286,909

CONTAINER

Filed Aug. 14, 1963 3 Sheets-Sheet 1

INVENTOR.
EDWARD W. SCHARRE

BY
ATTORNEYS

Nov. 22, 1966  E. W. SCHARRE  3,286,909
CONTAINER

Filed Aug. 14, 1963  3 Sheets-Sheet 2

INVENTOR.
EDWARD W. SCHARRE

BY
ATTORNEYS

Nov. 22, 1966 — E. W. SCHARRE — 3,286,909
CONTAINER
Filed Aug. 14, 1963 — 3 Sheets-Sheet 3

INVENTOR.
EDWARD W. SCHARRE
ATTORNEYS

United States Patent Office 3,286,909
Patented Nov. 22, 1966

3,286,909
CONTAINER
Edward W. Scharre, Louisville, Ky., assignor to Anaconda Aluminum Company, a corporation of Montana
Filed Aug. 14, 1963, Ser. No. 302,072
6 Claims. (Cl. 229—51)

This invention relates to containers and more particularly it relates to a two-component container of a pan and an outer protective cover for the pan which also serves as a lid for covering the opening in the pan.

Foodstuffs are often packaged in rigid aluminum foil pans or trays with a lid sealed to the pan to close the pan opening and hermetically seal the foodstuff therein. The lidded pan is then inserted into a separate protective box for shipping and marketing. In this type container three components are required to package the foodstuff including a separate box which must be folded about the lidded pan solely for the purpose of protecting the fragile pan containing the foodstuffs from damage due to handling. It is impractical to market the sealed pan without the protective box for the thin walled aluminum pan cannot resist denting and bending and the appearance of the pan would be unmarketable if so damaged.

I have developed a two-component container which consists simply of a pan for holding the contents and a cover which in a novel way both seals the opening to retain the contents in the pan and is folded around the pan to form an outer protective cover for the pan. This new container is far less expensive to make than the three-component containers and presents a decidedly neater package than the former packages. It is to noted that the pan and the outer protective cover are assembled integral with each other and it is not possible that there will be any slippage between the outer protective box and the pan. With the new container the pan is always maintained in a set position relative to the protective cover resulting in a stable package in which there is no shifting of the pan within its protective box.

Broadly stated the container of the invention is comprised of a pan for holding the contents therein and a cover closing the pan opening and surrounding at least the sides of the pan. The cover has a closure portion sealed about the periphery of the pan defining the opening in the pan and integral flap portions are folded around the sides of the pan to form a lid and an outer protective cover. In a more specific embodiment the cover is characterized by having a rectilinear closure portion sealed about the periphery defining the opening in the pan, end flap portions extending from the respective opposite ends of the closure portion and edge portions extending from the end flap portions. Side flap portions extend from opposite sides of the closure portion and wing portions extend laterally from each of the respective side flaps. With this construction the end flap portions and the edge portions are folded down about the sides of the pan with the wing portions being maintained positioned between the pan and the end portions by folding the respective edge portions under the wing portions, thereby providing the outer protective box.

It is also part of the invention to include pairs of cooperating score lines cut into but not through the cover in the plane of the closure portion with the major length of the score lines overlying the pan opening and at least one pair of score lines cut into one of the flap portions to define a starting tab to permit ease of opening of the container. By providing the score lines as described, the container can be easily opened by simply tearing the cover portion, and the container formed in this fashion is a self-contained easily openable assembly.

Broadly stated, the method of forming the containers includes adhesively sealing a cover about the opening in the pan, and then folding portions of the cover at least around the sides of the pan to form an outer protective cover for the pan. More specifically, the method involves continuously dispensing pre-cut covers over the opening of filled pans, heat sealing a closure portion of the cover to the preiphery of the pan which defines the pan opening to seal the contents therein, wiping portions of the cover about the sides of the pan and folding portions of the cover to form an outer protective cover for the pan. Obviously the method saves many of the packaging steps formerly required when the three-component container heretofore used was formed.

The manner of forming the containers and a preferred embodiment of the invention is described hereinbelow with reference to the drawings wherein.

Figure 1:
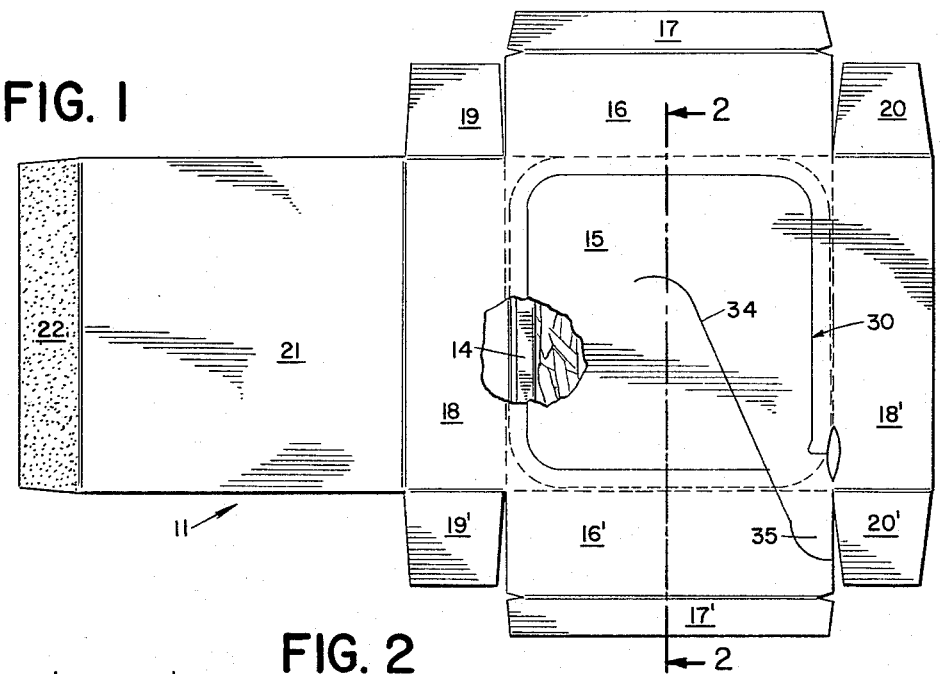
FIG. 1 is a plan view partly broken away of a container closure sealed to a pan but not folded about the pan.
Figure 2:
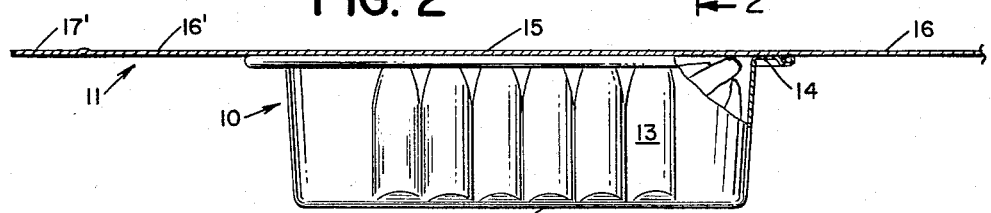
FIG. 2 is a section taken substantially along the lines 2—2 of FIG. 1.

Referring initially to FIGS. 1 and 2, the container of the invention consists essentially of two components namely a pan 10 and a cover 11. The pan 10 shown is formed from thin gauge aluminum and is generally rectangular in shape and has a closed bottom 12, relatively vertical sides 13 and a peripheral marginal flange 14 which is located at the top of the sides 13 of the pan and serves to define the opening in the pan. The cover 11 consists of a paperboard laminate having thin plies of aluminum foil located on each broad surface thereof. The cover is pre-cut to a predetermined form and includes a rectangular closure portion 15 of substantially the same size as that defined by the flange 14 of the pan. The cover 11 is adhesively and hermetically sealed to the pan 10 with the closure portion 15 covering the opening in the pan and adhesively sealed to the flange 14 as shown in FIG. 1. The closure which is formed from a unitary piece of laminated paperboard has end flaps 16 and 16' extending from opposite sides of the closure portion 15 and similarly extending from each of the end flaps are end edge flaps 17 and 17'. Extending from the two remaining opposite sides of the closure portion 15 are side flaps 18 and 18'. The side flaps have wing portions 19 and 19' and 20 and 20' extending laterally from the respective side flaps 18 and 18'. Extending from a side flap 18 in the same direction that the side flap 18 extends from the closure portion 15 is a bottom closure portion 21 which is of substantially the same size as the closure portion 15. Further extending from the bottom portion in the same direction as the bottom closure portion extends from the side flap 18 is an adhesively coated sealing flap 22.

Figure 3:
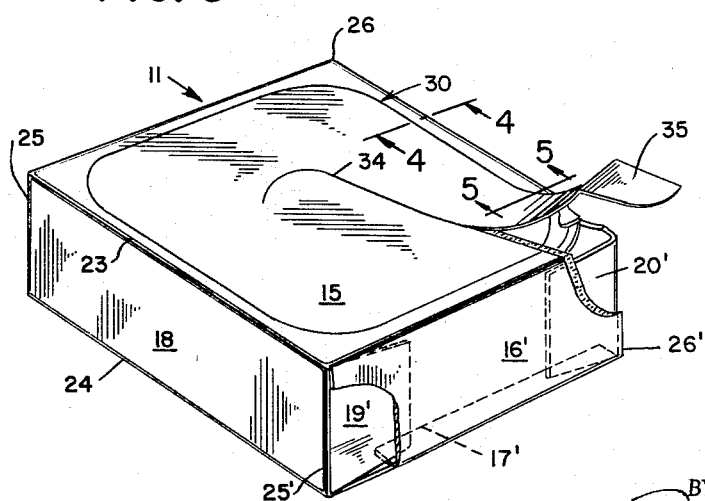
FIG. 3 is a perspective of the container of FIG. 1 in its assembled condition.

In forming the container of FIG. 1 to its finished shape shown in FIG. 3, the side flap 18, bottom closure portion 21, and sealing flap 22 are wiped vertically downward to form a top side edge 23 along the line of the fold. The bottom closure portion 21 is then folded along the line of connection between the side edge flap 18 and the bottom closure portion 21 to form a bottom side edge 24 and thereby position the bottom closure portion beneath the bottom 12 of the pan 10. The adhesive sealing portion 22 is then folded vertically upward along the side of the pan opposite to the side along which the side flap 18 lies and the side flap 18' is then folded down against the adhesive sealing portion 22 and is pressed into adhesively sealed contact therewith. The wing portions 19' and 20' and 19 and 20 are then folded wing portions 19' and 20' and 19 and 20 are then folded in toward each other to define corner edges 25 and 26 and 25' and 26'. The end flaps 16 and 16' are then wiped down against the wing flaps and the end edge flaps are folded under the wing portions and tucked into the bottom closure portion 21. The container thus formed is in substantially the shape shown in FIG. 3 wherein the opening in the pan 10 is closed by the cover and the cover is folded around the pan 10 to completely contain the pan within the folded cover.

Figure 4:
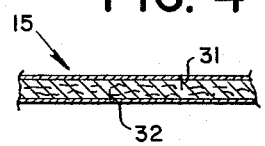
FIG. 4 is a fragmentary section taken substantially along the lines 4—4 of FIG. 3.
Figure 5:
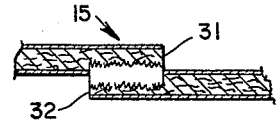
FIG. 5 is a fragmentary section taken substantially along the lines 5—5 of FIG. 3.

In order to permit ease of opening the container to get at the contents contained within the pan 10, pairs of cooperating score lines are formed in the cover 11. As shown in FIG. 3 and FIG. 4 a first pair 30 of cooperating score lines is cut into the closure portion 15 of the over and extends in the plane of the closure portion and substantially overlies or outlines the periphery of the pan 10. As shown in FIG. 4 the pair of cooperating score lines are cut into but not through the closure 11 from opposite sides thereof with the score line 31 on one side generally registering with but slightly offset from a corresponding score line 32 on the other side whereby the member is separable along a portion 33 thereof between the cooperating score lines as shown in FIG. 5. A second pair of cooperating score lines 34 are cut into a corner portion 35 of the end flap 16' and extends into the plane of the closure portion generally spaced from the first pair of cooperating score lines 30 and overlying the opening of the pan but substantially intersecting the first pair of score lines at one point and thereby associated with the first pair of score lines to permit removal of the portion of the closure portion outlined by peripheral extension of the first pair of cooperating score lines. As shown in FIG. 3 owing to the manner in which the second pair of cooperating score lines 34 is cut into the end flap 16', a tab is defined by a corner portion 35 of the end edge portion and by simply lifting the tab 35 the second pair of score lines 34 begins to separate in the manner shown in FIG. 5 and upon further lifting the first pair of score lines also begin to separate thereby permitting complete removal of the closure portion and easy access to the contents of the pan.

Figure 6:
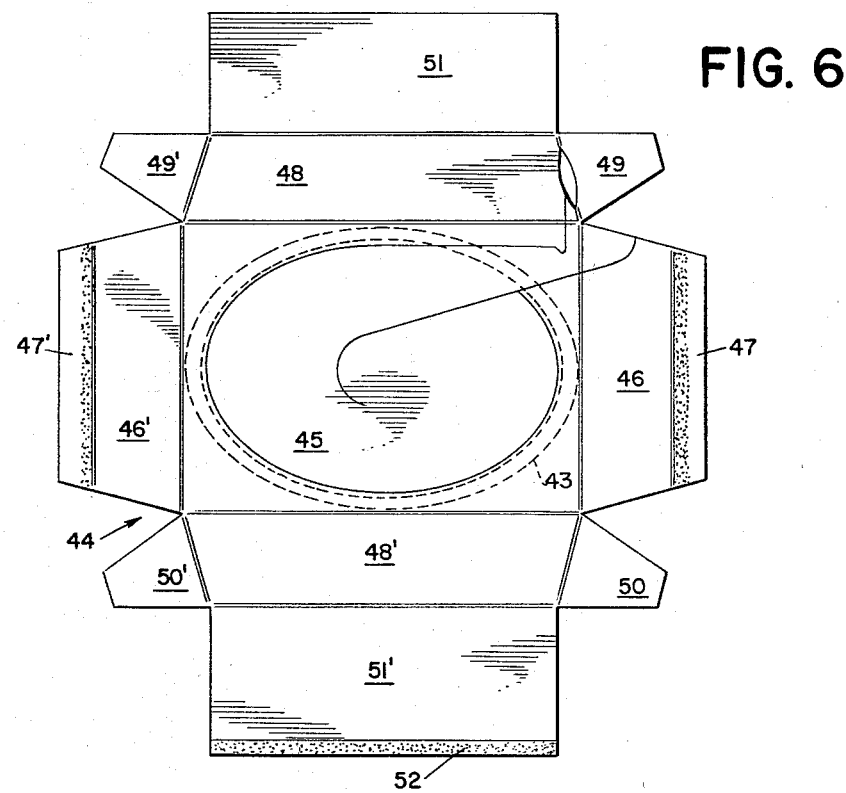
FIG. 6 is a plan view of a second embodiment of the container of the invention showing the closure sealed to a pan but not folded about the pan.
Figure 7:
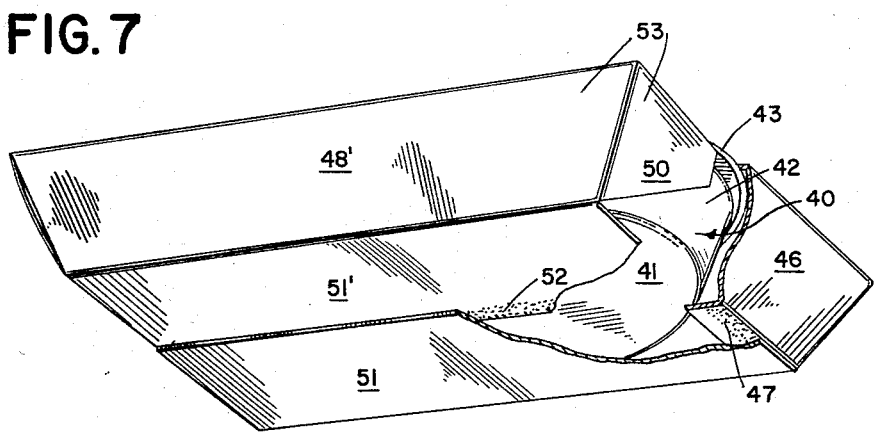
FIG. 7 is a perspective partly broken away of the folded container of FIG. 6.

A second embodiment of the container of the invention is shown in FIGS. 6 and 7. A pan 40 having a generally oval shape with a bottom 41, side walls 42 and a peripheral flange 43 defining the opening in the pan has a cover 44 adhesively sealed to the peripheral flange portion 43 thereof. The cover 44 is a unitary piece of precut paperboard laminate and has a closure portion 45 of substantially rectangular shape which is the portion adhesively sealed to the pan 40. Extending from opposite sides of the closure portion are end flap portions 46 and 46' and similarly extending from the end flap portions 46 and 46' are end edge portions 47 and 47' which in this embodiment are adhesively coated. It is to be noted that the end flap portions taper to a smaller dimension as they extend further away from the closure portion 45. Extending from the remaining opposite sides of the closure portion 45 are side flap portions 48 and 48'. The side flap portions also taper as they extend out from the closure portion 45 and have wing portions 49 and 49' and 50 and 50' extending from the tapering edges of the side flap portions. The wing portions also taper to a smaller dimension as they extend outwardly from the side flap portions. Extending from the side flap portions 48 and 48' in a similar direction as the side flap portions extend from the closure portion 45 are first and second bottom closure portions 51 and 51'. The second bottom closure portion 51' has an adhesive coating 52 on its outermost edge portion.

In folding the cover 44 to the shape shown in FIG. 7 the side flap portions are first wiped vertically along the side walls 42 of the pan 40 and the wing portions 50' and 49' and 50 and 49 are respectively folded toward each other. The end flap portions 46 and 46' are then wiped vertically downwardly against respective wing portions and the end edge portions 47 and 47' are folded under the wing portions to underlie partially the bottom 41 of the pan 40. The second bottom closure portion 51' is then folded beneath the pan 40 and against the adhesively coated end edge portions 47 and 47' and the first bottom closure portion is similarly folded beneath the pan 40 and in adhesive contact with the end edge portions 47 and 47' and overlaps the second bottom closure portion at the adhesively coated marginal portion 52 to seal the bottom closure portions adhesively together and adhesively to seal the bottom closure portions to the end edge portions 47 and 47', thereby defining a generally rectangular shaped cover containing the pan 40 therein with tapering side walls 53 formed therein.

Figure 8:
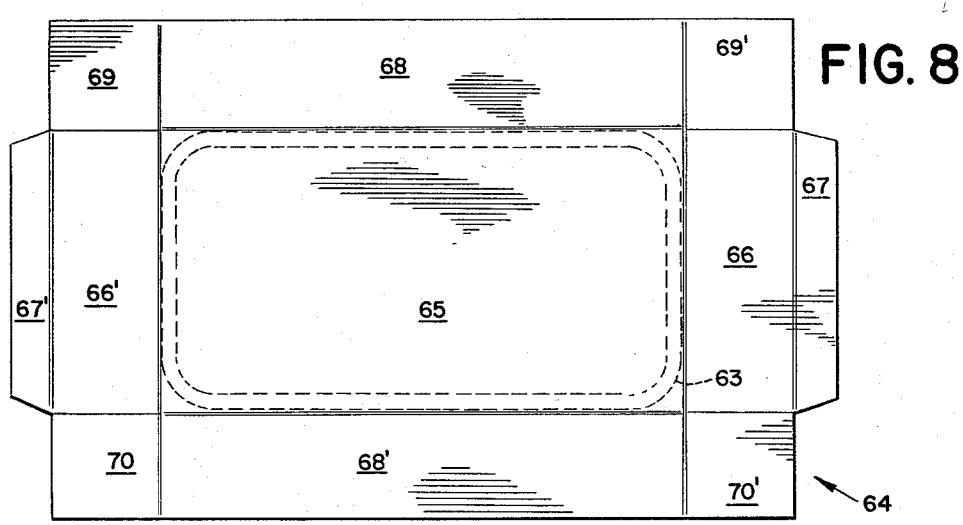
FIG. 8 is a plan view of a third embodiment of the container of the invention sealed to a pan but not folded about the pan.
Figure 9:
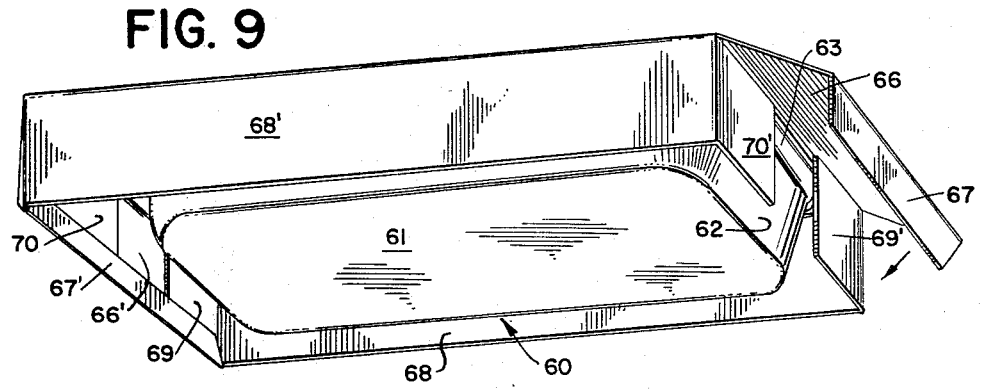
FIG. 9 is a perspective of the nearly assembled container of FIG. 8.

Referring now to FIGS. 8 and 9, the third embodiment of the invention is shown where a generally rectangular shaped pan 60 having a bottom 61 and side walls 62 and a peripheral flange 63 defining the opening of the pan, has a cover 64 sealed to the peripheral flange portion 63 to close the opening in the pan. The cover 64 consists of a unitary piece of pre-cut laminated paperboard and includes a closure portion 65 having a generally rectangular shape. Extending from opposite sides of closure portion 65 are end flaps 66 and 66' and further extending from the end flaps in the same manner as the end flaps extends from the closure portion are end edge portions 67 and 67'. Extending from the remaining opposite sides of the closure portion 65 are side flap portions 68 and 68' and extending laterally from the side flap portions 68 and 68' are wing portions 69 and 69' and 70 and 70'. It is to be noted that in this embodiment there is no bottom closure portion provided in the cover 64. In order to fold the cover 64 into the shape shown in FIG. 9 the side flaps 68 and 68' are first wiped vertically downward along the side walls 62 of the pan 60 and the wing portions 69 and 70 and 69' and 70' respectively are folded in toward each other. The end flap portions 66 and 66' are then wiped vertically downward against the wing portions and the end edge flaps are turned back against the wing portions between the side walls 62 of the pan and are adhesively sealed to the wing flaps at this point to form a rectangulr rigid side protective cover about the pan 60.

Figure 10:
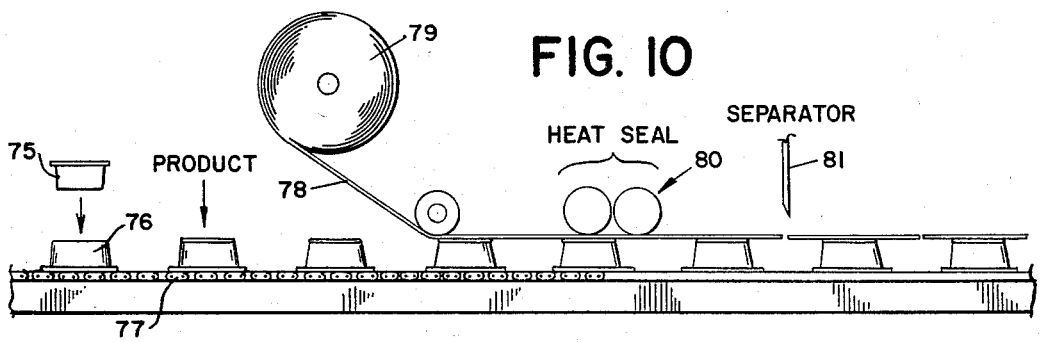
FIG. 10 is a schematic of a method of forming the containers.

As shown in FIG. 10 pan 75 is inserted into a receptacle 76 which is conveyed along a continuous conveyor 77. The products or contents are then inserted into the pan 75 and the filled pans 75 are then further conveyed along the conveyor 77. Pre-cut covers 78 which are lacquered on their underside to permit adhesive sealing are dispensed from a supply roll 79 and are placed over the opening in the pan 75. They are immediately heat sealed by a suitable heat sealing apparatus 80 and the joined covers 78 are then separated by a cutting blade 81. The side and end flap portions are then wiped down in the manner described above and the cover is folded about the pan as described in the usual manner of box making. It is to be noted that by use of only two components the method is very much simplified in that the cover of the pan is also an initial step in the making of the box or the outer cover which is to be formed around the pan.

I claim:
1. A container comprising a pan for holding the contents therein, and a unitary rigid cover closing the pan opening and surrounding at least the sides of the pan to form both a lid and an outer protective cover, said cover having a rectilinear closure portion sealed about the periphery defining the opening in the pan, end flap portions extending from respective opposite ends of the closure portion, edge portions extending from said end flap portions, side flap porotion extending from respective opposite sides of the closure portion, and wing portions extending laterally from each of the respective side flaps whereby said end flap portions and said edge portions are folded down about the sides of the pan with the wing portions being maintained positioned between the pan and the end portions by folding the respective edge portions under the wing portions.

2. A container as in claim 1 wherein cooperating score lines are cut into but not through the cover in the plane of the closure portion with the major portion of the score lines extending within the periphery of the pan opening to permit ease of opening of the cover for access to the contents.

3. A container comprising a pan for holding the contents therein, and a unitary rigid cover closing the pan opening and surrounding at least the sides of the pan, said cover having a rectilinear closure portion sealed about the periphery defining the opening in the pan, end flap portions extending from the respective opposite ends of the closure portion, edge portions extending from said end flap portions, side flap portions extending from the respective opposite sides of the closure portion, wing portions extending laterally from the side flaps, and at least one bottom closure portion extending from at least one of said side edges whereby said end flap portions and said edge portions are folded down about the sides of the pan with the wing portions being maintained positioned between the pan and the end portions by folding and locking the respective edge portions against the bottom portions and folding the bottom closure beneath the pan thereby containing the pan in the cover.

4. A container as in claim 3 wherein the bottom closure is comprised of two portions each extending from the respective side flap portions and sealed together beneath the pan.

5. A container as in claim 4 wherein easy opening means are provided in the cover comprising a first pair of cooperating score lines cut into said closure portion and extending in the plane of the closure portion substantially overlying the periphery of the pan, and a second pair of cooperating score lines cut into said closure portion and extending in the plane of said closure portion generally spaced from the first pair of cooperating score lines and overlying the opening of the pan but substantially intersecting said first pair of score lines at one point thereof and associated with said first pair of cooperating score lines to permit removal of at least a part of said closure portion, said pairs of cooperating score lines being cut into but not through said closure portion from opposite sides thereof with each score line on one side generally registering with but slightly offset from a corresponding score line on the other side whereby said member is separable along a portion thereof between the cooperating score lines.

6. A container as in claim 4 wherein said second pair of cooperating score lines are cut into one of said flap portions to provide a starting tab to permit ease of opening the container.

References Cited by the Examiner

UNITED STATES PATENTS

| | | | |
|---|---|---|---|
| 2,024,033 | 12/1935 | Epstein | 220—97 |
| 2,146,984 | 2/1939 | Powell | 206—45.34 |
| 2,262,803 | 11/1941 | Huffield | 229—51 |
| 2,335,198 | 11/1943 | Smith | 229—87 |
| 2,428,498 | 10/1947 | McWilliams | 206—78 |
| 2,447,690 | 8/1948 | Ekstedt et al. | 53—39 |
| 2,645,337 | 7/1953 | Stenger | 206—46 |
| 2,649,392 | 8/1953 | Marshall | 53—39 |
| 2,833,404 | 5/1958 | Jacobs et al. | 229—51 |
| 2,844,245 | 7/1958 | Gruber et al. | 220—23 |
| 2,904,170 | 9/1959 | Hennessey et al. | 206—46 |
| 2,935,188 | 5/1960 | Thomas | 206—42 |
| 2,944,717 | 7/1960 | Lynch | 206—46 X |
| 2,970,735 | 2/1961 | Jacke et al. | 229—3.5 |
| 3,011,629 | 12/1961 | Rohdin. | |
| 3,036,729 | 5/1962 | Asman | 229—51 |
| 3,054,680 | 9/1962 | Mennen | 229—51 |
| 3,087,823 | 4/1963 | Hein et al. | 206—46 X |
| 3,144,194 | 8/1964 | Cartwright | 229—51 |
| 3,168,193 | 2/1965 | Schechter | 206—56 |

THERON E. CONDON, Primary Examiner.

FRANKLIN T. GARRETT, GEORGE O. RALSTON, MARTHA L. RICE, Examiners.

V. A. TOMPSON, Assistant Examiner.